US007039474B2

(12) United States Patent
Bonnain et al.

(10) Patent No.: US 7,039,474 B2
(45) Date of Patent: May 2, 2006

(54) PACKAGING SYSTEM AND METHOD THEREFOR

(75) Inventors: Jean-Christophe Bonnain, Chateauroux (FR); Arnaud Boutin, Maillet (FR); Gaelle Multon, Sauzelles (FR)

(73) Assignee: MeadWestvaco Packaging Systems LLC, Stamford, CT (US)

( * ) Notice: Subject to any disclaimer, the term of this patent is extended or adjusted under 35 U.S.C. 154(b) by 0 days.

(21) Appl. No.: 10/807,056

(22) Filed: Mar. 19, 2004

(65) Prior Publication Data

US 2004/0254666 A1 Dec. 16, 2004

Related U.S. Application Data

(63) Continuation of application No. PCT/US02/29862, filed on Sep. 20, 2002.

(30) Foreign Application Priority Data

Sep. 20, 2001 (GB) .................................. 0122681

(51) Int. Cl.
*G05B 11/01* (2006.01)

(52) U.S. Cl. ............................. 700/21; 700/78; 700/79; 700/80; 700/81; 700/82; 700/108; 702/108; 702/181; 702/182

(58) Field of Classification Search .................. 700/21, 700/26, 23, 28, 73, 79, 80, 81, 82, 174, 86, 700/17, 170, 78, 108, 96; 702/180, 181, 702/182
See application file for complete search history.

(56) References Cited

U.S. PATENT DOCUMENTS

| 4,758,964 | A | | 7/1988 | Bitner et al. |
| 5,279,098 | A | * | 1/1994 | Fukuda ........................ 53/451 |
| 5,284,164 | A | | 2/1994 | Andrews et al. |
| 5,422,831 | A | | 6/1995 | Misra et al. |
| 5,467,355 | A | | 11/1995 | Umeda et al. |
| 5,551,206 | A | * | 9/1996 | Fukuda ........................... 53/75 |
| 5,706,627 | A | * | 1/1998 | Kirka et al. .................... 53/52 |
| 5,796,221 | A | * | 8/1998 | Cramer et al. ................ 318/68 |
| 5,836,136 | A | * | 11/1998 | Highberger .................... 53/75 |
| 5,966,897 | A | * | 10/1999 | Kirka et al. .................... 53/55 |
| 6,047,220 | A | | 4/2000 | Eryurek |
| 6,047,275 | A | | 4/2000 | Jaremko et al. |
| 6,081,981 | A | * | 7/2000 | Demarest et al. ......... 29/407.08 |
| 6,253,159 | B1 | | 6/2001 | Bett et al. |
| 6,264,591 | B1 | | 7/2001 | Keen et al. |
| 2002/0079022 | A1 | * | 6/2002 | Colle .......................... 144/382 |

FOREIGN PATENT DOCUMENTS

| GB | 2082797 A | 3/1982 |
| GB | 2135799 A | 9/1984 |
| GB | 2285700 A | 7/1995 |
| WO | 96/40558 | 12/1996 |

* cited by examiner

*Primary Examiner*—Ramesh Patel
(74) *Attorney, Agent, or Firm*—Tsugihiko Suzuki MWV Parks Knowlton LLC; Michael V. Drew, Esq.

(57) ABSTRACT

A system for monitoring the condition of a packaging machine during operation and diagnosing potential problems in the performance of the machine. The system comprises an input device, an output device and a processing unit that supports a user interface presented by the output device. The processing unit is arranged to permit a user, when in use, to input via the user interface a number of pre-determined parameters to measure one or more elements or assemblies in the machine, to receive information from one or more sensors measuring the element or assembly and to analyse the information with the parameter to render via the output device a signal.

11 Claims, 7 Drawing Sheets

PACKAGING SYSTEM AND METHOD THEREFOR

This is a continuation of international application No. PCT/US02/29862, filed Sep. 20, 2002, which is hereby incorporated by reference.

BACKGROUND OF THE INVENTION

The present invention relates to a system for identifying abnormal operation of a packaging machine, for example, of the type used to package consumer products such as cans and bottles into multiple packaged cartons. The present invention also relates to a method of identifying abnormal operation of a packaging machine and a diagnostic apparatus for a same purpose.

The majority of known packaging machines are dedicated machines which can construct only one size or type of carton. Therefore, modern bottling plants are required to use several packaging machines to package different carton types. Some packaging machines are capable of packaging different types or sizes of cartons. All such machines require adjustment when switching from one size or type of carton to another.

Packaging machines will typically package approximately 60,000 to 200,000 articles per hour and are required to run continuously for long periods of time. A machine failure or scheduled maintenance means that the machine cannot be used (known as "down time"), which is an expensive delay in a bottling plant. Such a delay will usually result in down time for the entire bottling line, not just the packaging machine, particularly if problems have arisen.

SUMMARY OF THE INVENTION

According to a first aspect of the present invention, there is provided a system for identifying abnormal operation of a packaging machine, the system comprising: a sampling unit arranged to sample a signal issued, when in use, to a servo-motor, the signal corresponding to torque values of the servo-motor; a spectrum analyzer for generating a spectral analysis of the sampled signal; a processing unit coupled to a storage device for storing a characterization of a mechanical element coupled to the servo-motor and corresponding to a state of operation, the characterization corresponding to at least one predetermined value for each of at least one frequency of the signal; wherein the processing unit is arranged to determine, when in use, abnormal operation of the mechanical element using the spectral analysis of the sampled signal and the characterization of the mechanical element.

Preferably, the system further comprises the state of normal operation.

Preferably, the processing unit is arranged to determine an actual sampling rate of the sampling unit.

Preferably, the actual sampling period is derived from an expected sampling period, an expected speed and an actual position of the servomotor.

Preferably, a correction factor is calculated from the actual sampling period and the expected sampling period for applying to the sampled signal.

Preferably, the characterization is either learnt by the system or extracted from a database containing rules.

Preferably, when characterization is based upon rules, fuzzy logic is used to quantify the abnormal operation of the mechanical element.

Preferably, the system further comprises the at least one predetermined value for each of the at least one frequency of the signal embodied in at least one respective rule applicable, when in use, to the spectral analysis of the signal.

According to a second aspect of the present invention, there is provided a diagnostic apparatus for identifying abnormal operation of a packaging machine, the apparatus comprising: a processing unit arranged to receive a sampled signal issued, when in use, to a servo-motor, the signal corresponding to torque values of the servo-motor; wherein the processing unit is coupled to a storage device for storing a characterization of a mechanical element coupled to the servo-motor, the characterization comprising at least one predetermined value corresponding to a plurality of the torque values of the servo-motor in a condition of normal operation; and the processing unit is arranged to determine, when in use, abnormal operation of the mechanical element using the sampled signal and the characterization of the mechanical element.

According to a third aspect of the present invention, there is provided a method of identifying abnormal operation of a packaging machine, the method comprising the steps of: sampling a signal issued to a servo-motor, the signal corresponding to torque values of the servo-motor; retrieving a previously stored characterization of a mechanical element coupled to the servo-motor, the characterization comprising at least one predetermined value corresponding to a plurality of the torque values of the servo-motor in a condition of normal operation; and determining abnormal operation of the mechanical element using the sampled signal and the characterization of the mechanical element.

In an embodiment of the invention, there is provided a computer program element comprising: computer program means to make a computer execute the method as set forth in accordance with the third aspect of the present invention.

Preferably, the computer program element is embodied on a computer readable medium.

According to a fourth aspect of the present invention, there is provided a system for monitoring the condition of a packaging machine during operation and diagnosing potential problems in the performance of the machine, the system comprising an input device, an output device and a processing unit that supports a user interface, the processing unit being arranged to permit a user, when in use, to input via the user interface a number of predetermined parameters to measure one or more elements or assemblies in the machine, to receive information from one or more sensors measuring the element or assembly and to compare the information with the parameter to render via the output device an output signal.

According to an optional feature of the fourth aspect of the invention the output signal is a warning message displayed on the output device. Optionally, the output signal actuates an auto-correction device.

Preferably, the output signal is a message warning the operator about scheduled maintenance.

According to a fifth aspect of the present invention, there is provided a programmed computer for generating control data for controlling a packaging machine, comprising memory having at least one region for storing computer executable program code, and a processor for executing the program code stored in the memory, wherein the program code includes: code to receive input data corresponding to a number of measurements made respectively based upon measurements recorded by one or more sensors monitoring an element or assembly of the machine; code to generate a comparison between the input data and stored data corresponding to pre-determined parameters for the element or assembly; code to generate output data for the packaging machine when the input data does not correspond to the stored data.

According to a sixth aspect of the present invention, there is provided a computer readable medium having computer executable software code stored thereon, the code being for the monitoring of a packaging machine and comprising: code to receive input data corresponding to a number of measurements made respectively based upon measurements recorded by one or more sensors monitoring an element or assembly of the machine; code to generate a comparison between the input data and stored data corresponding to pre-determined parameters for the element or assembly; code to generate output data for the packaging machine when the input data does not correspond to the stored data.

It is thus possible to provide a system for identifying abnormal operation of a packaging machine that overcomes the technical and commercial disadvantages of known systems. In particular, it is possible to provide information to an operator on various aspects of the packaging machine to provide preventative maintenance, conditional maintenance for likely problems prior to any catastrophic failure of the machine.

BRIEF DESCRIPTION OF THE DRAWINGS

Exemplary embodiments will now be described, by way of example only with reference to the following drawings in which.

DETAILED DESCRIPTION OF THE PREFERRED EMBODIMENTS

Throughout the following description, identical reference numerals shall be used to identify like parts.

Figure 1:
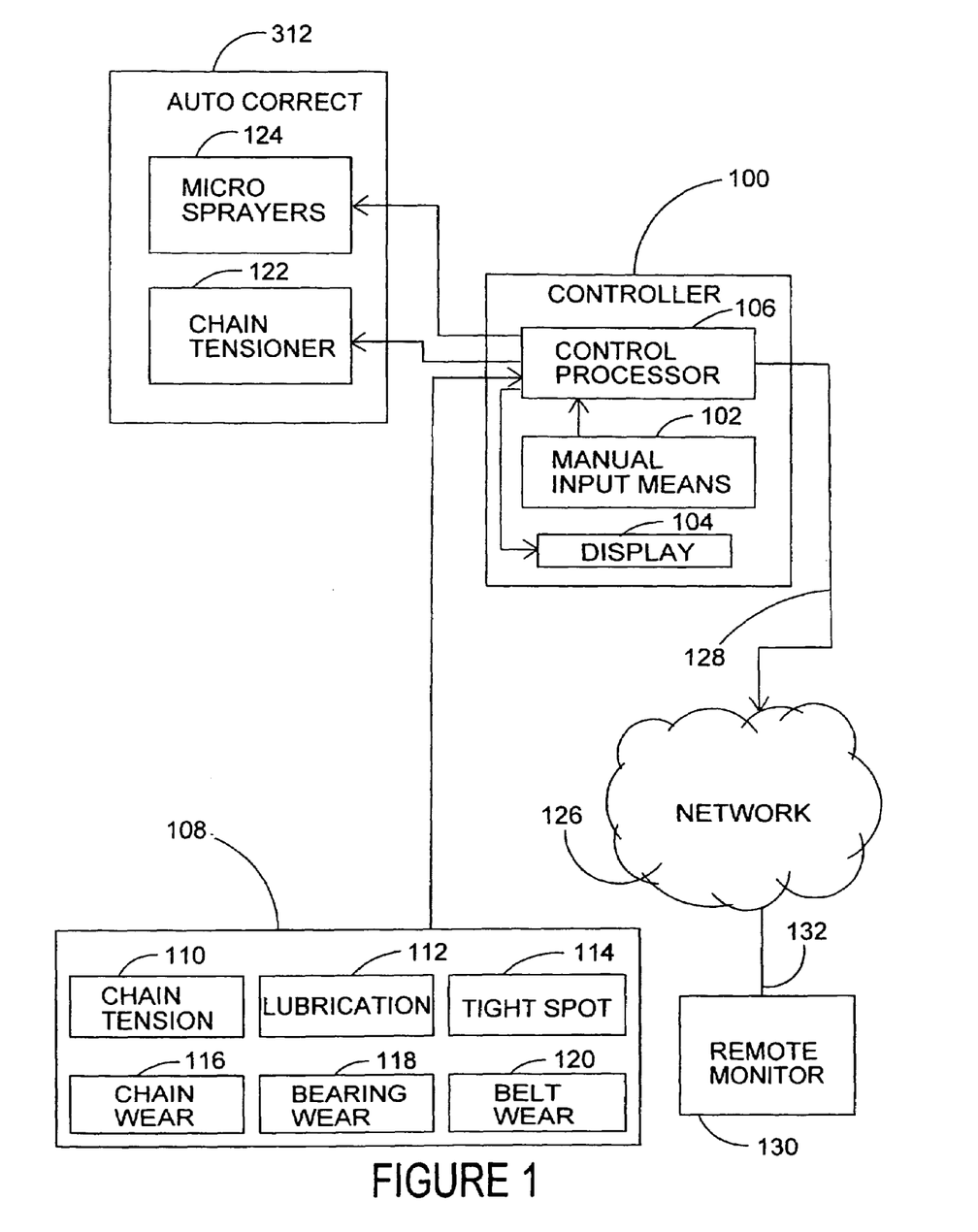
FIG. 1 is a block diagram of a control system in accordance with a first embodiment of the invention.

Referring to the drawings and in particular FIG. 1 there is shown a system for integrating electrical and mechanical data and information technology in a packaging machine for improving productivity by forecasting and scheduling maintenance so that down time will not adversely impact production and market needs. The system can be employed on new machinery or fitted to existing packaging machines that have GEN II or GEN III architecture (that is, architecture utilizing different deployment of PC's and PLC'S), on a retrofit basis.

The system is used to improve the machine efficiency by enabling an operator to perform (i) preventative maintenance, (ii) condition maintenance, and (iii) re-engineer assemblies to improve performance.

The system comprises a controller 100 fitted to a packaging machine (not shown), but is usually incorporated into the existing control means. The controller 100 comprises an input device 102, an output device 104 and a processing unit 106 that supports a user interface presented by the output device 104.

Figure 2:
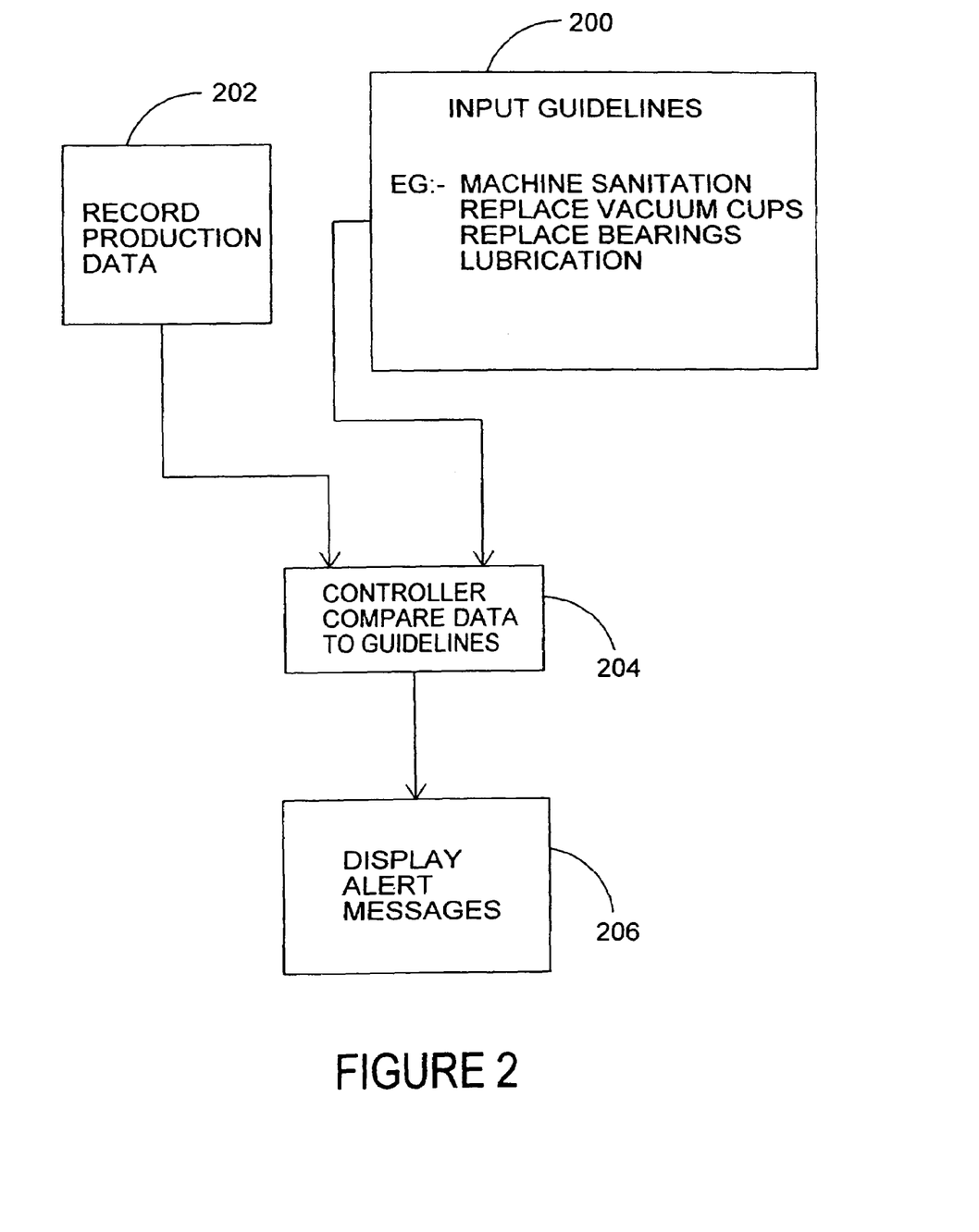
FIG. 2 is a flow diagram of a control system for preventative maintenance in accordance with one embodiment of the present invention.

To use the system in preventative maintenance mode, as shown in FIG. 2, a user will input pre-determined parameters for the maintenance of key assemblies and elements of the packaging machine, for example machine sanitation, replacement of vacuum cups, replacement of bearings and lubrication 200. The parameters are based upon number of cartons used and hours of production, so that the next scheduled maintenance is determined by the controller 106. The controller will record production data 202 and compare it to the parameters 204. At the point when the next scheduled maintenance for one or more of the elements is required, the controller 106 will output a message to the display 104, alerting the operator to the element or assembly to be maintained 206.

In order to perform condition maintenance, the system includes elements to diagnose problems. To achieve this, there further comprises a number of sensors 108 for monitoring various physical parameters. The physical parameters can be processed in order to provide additional parameters, as shown in FIG. 1. For example, a signal corresponding to a torque of a motor can undergo spectral analysis, amplitude at a specific frequency revealed by the spectral analysis being of use as a parameter in a diagnostic process. Whilst, in at least one example of the present invention contained herein, sensors are employed in order to probe physical parameters, direct evaluation of physical parameters by a device constituting a sensor is possible. An example of such a sensor is a servomotor as it is able to provide a signal corresponding to the torque of the servomotor.

For example, to monitor the various chain or belt assemblies, the chain tension 110 is monitored by measuring and processing the torque of the servomotor driving each chain.

Preferably, the lubrication 112 is analyzed by measuring the servo motor torque to diagnose for poor lubrication.

This system is also used to diagnose a 'tight spot' 114. In a packaging machine, the 'tight spot' occurs when the package binds with one of the guides or moving parts on a conveyor or chain due to glass, paper, dust, glue, etc. which will result in the conveyor chain/belt jolting.

Figure 3:
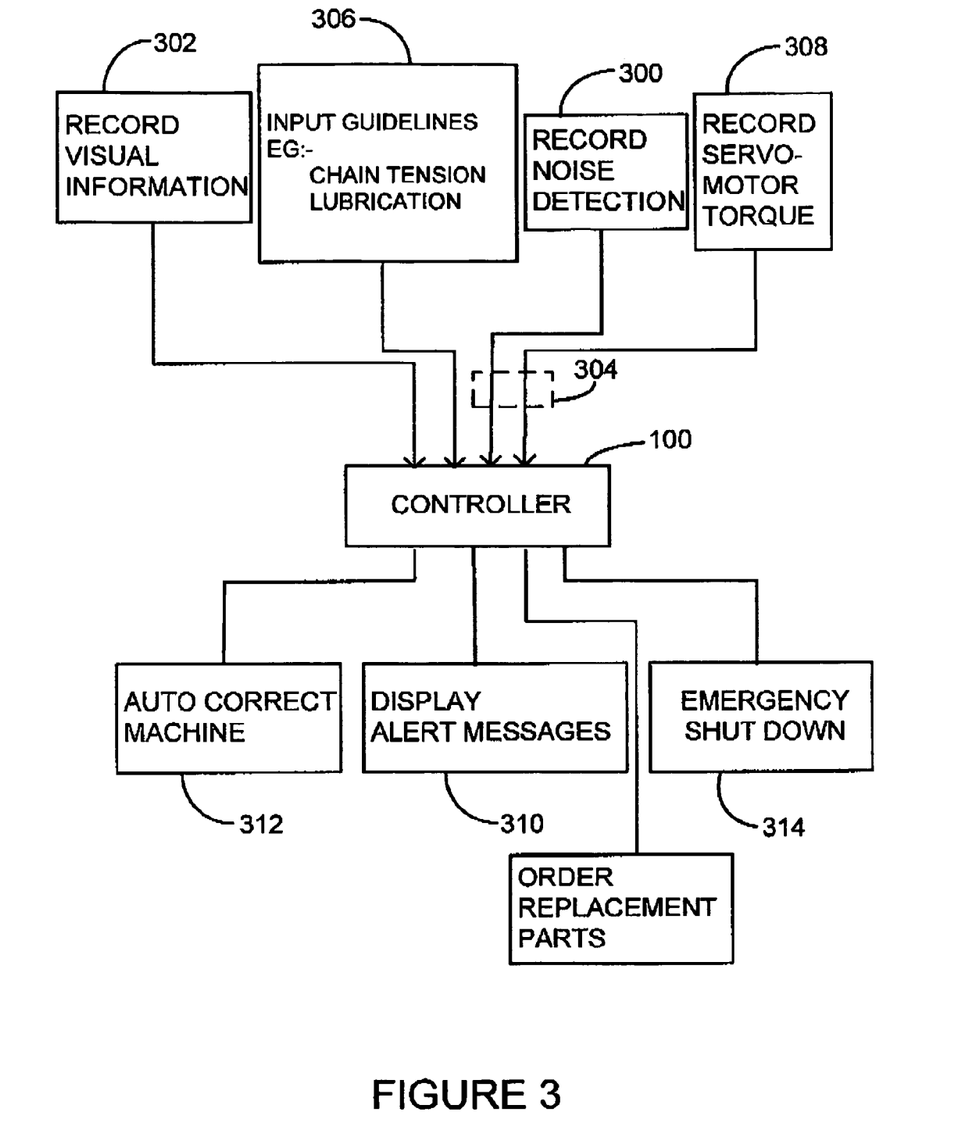
FIG. 3 is a flow diagram of a control system for conditional maintenance and re-engineering assemblies in accordance with one embodiment of the invention.

Sensors may also be used to monitor one or more of chain wear 116, bearing wear 118 and/or belt wear 120, again by monitoring the servo motor torque to diagnose one assembly chains or belts. Referring to FIG. 3, as regards the bearing wear analysis, a noise detection device 300 can be used in addition to, or as an alternative, to locate the particular position of a worn bearing.

Optionally, visual information 302 about the condition of the machine, for example monitoring star wheel condition, jam induced with an article, is recorded by high speed cameras and fed to the controller 100 where a file is generated and saved in the hard disk of a PC within the system.

In some embodiments, the signal from the sensor 108 will be filtered through known electronic filters 304 to reduce the background noise in the signal.

Pre-programmed parameters 306 for the various elements being monitored are entered into the controller, by pre-programming the system or by manually inputting the parameters in-situ. The parameters can be used as inputs for a computing system in order to evaluate the level of a specific problem, for example the chain tension evaluated using specific parameters and compared with upper and lower tolerance limits.

Information from the servo motor sensors 308, detected noise from the noise detection device 300 and visual information 302 is input into the control processor 106 and compared to the pre-programmed parameters, input for each servo motor or machine assembly. If the input measurement from the sensors is not within a predetermined range or tolerance limit, then the control processor 106 will issue an alert message 310 and the measurement compared to various known parameters for faults in the machine so as to display the fault. For example, if a chain is subjected to the tight spot, the torque measurement will indicate that there are a number of spikes at regular intermittent intervals and the processor will display an alert message. If the chain tension deviates either above or below the predetermined range, this will indicate the tension of the chain is too loose or too tight. Again, a message is communicated to the user via the display.

The operator will then intervene to correct the problem, or will monitor it more closely until scheduled maintenance.

Optionally, the controller 100 may include a fail safe monitoring parameter so that if there is a serious problem, for example the measurements exceed pre-programmed safe working parameters, the controller will output a signal to automatically shut down the machine 314.

With certain parameters it is possible to automatically correct 312 the defect and various auto-correction devices are employed in the machine. In the illustrated embodiment of FIG. 1, the system includes a chain tensioner 122 controlled by the controller to be automatically introduced or moved thereby to increase or decrease the tension of the chain so as to return the servo-motor torque to within the pre-programmed range. Similarly, if it appears that the lubrication has deteriorated then micro-sprayers 124 are switched on by the controller 100 to lubricate the chains automatically and without the need for turning the machine off.

The information recorded by the controller 100 is stored on hard disc or other storage medium to be used to monitor the performance of the machine remotely from the packaging plant. Remote monitoring is achieved by coupling the controller 100 to a communications network 126 via a first communications link 128. A server 130 is coupled to the communications network via a second communications link 132. In the present example, the communications network is the Internet and so the controller 100 is capable of communicating packets of data with the server 130 which are routed through the Internet to a remote monitor.

Figure 4:
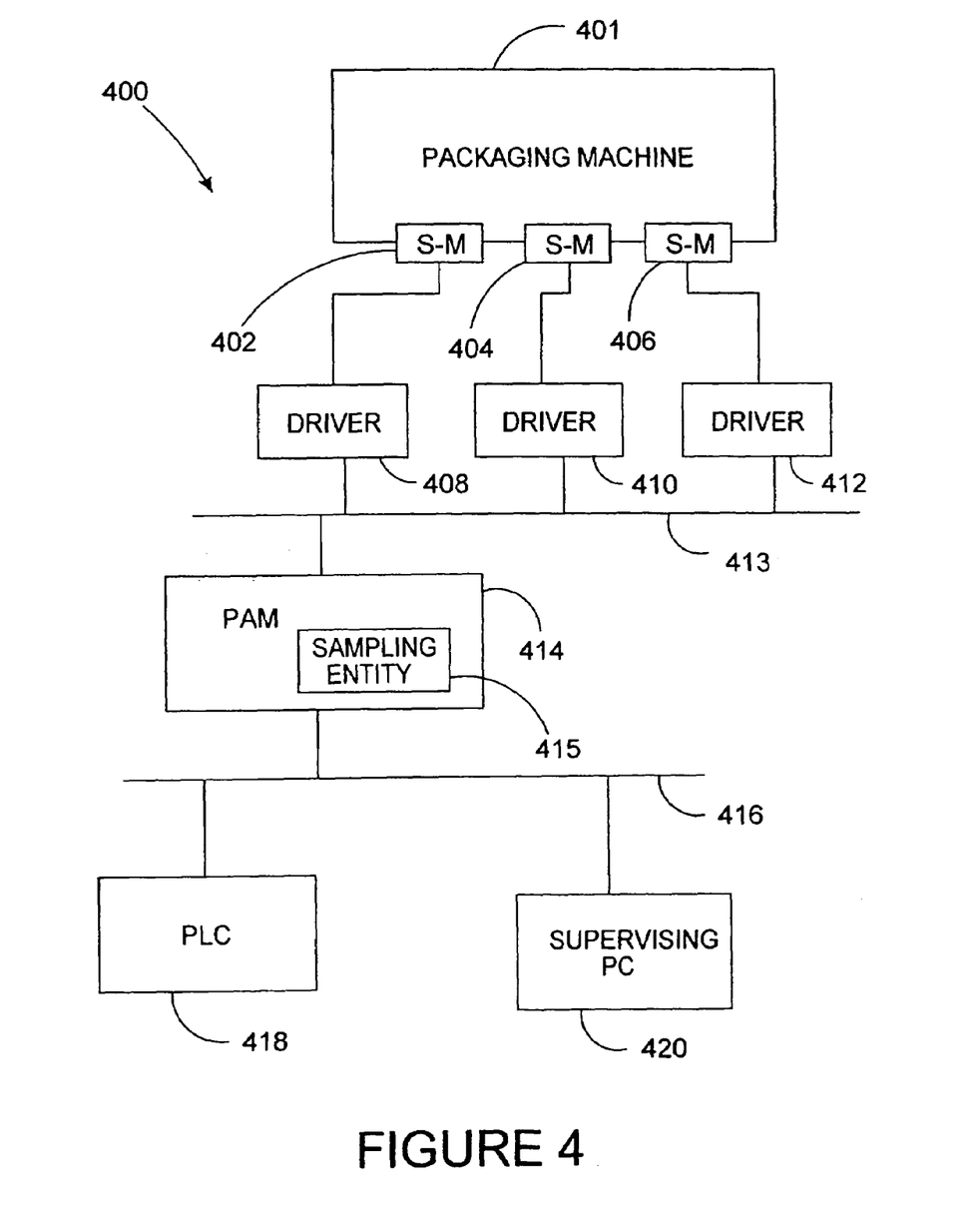
FIG. 4 is a schematic diagram of part of a packaging system including a diagnostic system constituting another embodiment of the present invention.

Referring to FIG. 4, in another embodiment a packaging system 400 comprises a packaging machine 401 to which a first servo-motor 402, a second servo-motor 404 and a third servo-motor 406 are coupled. A first driver unit 408, a second driver unit 410 and a third driver unit 412 are coupled to the first, second and third servo-motors 402,404, 406 respectively. In this example, the first, second and third driver units 408,410,412 are SAM Smart Digital Drives of the type manufactured by Inmotion™ Technologies, although it will be appreciated that other suitable drivers can be used.

Each of the first, second and third driver units 408,410, 412 is coupled to a data bus 413, the data bus 413 also being coupled to a driver management unit 414. In this example, the driver management unit 414 is a Programmable Axis Manager (PAM) manufactured by Inmotion™ Technologies, although it will again be appreciated that any suitable driver management equipment can be employed.

The PAM 414 supports a real-time task 415 that periodically samples a driving signal issued by any one or more of the first, second or third driver units 408,410,412 respectively to the first, second or third servo-motors 402,404,406. The task 415 is activated, for example, every 10 ms if a sampling frequency of, for example, 100 Hz is required. The driving signals sampled by the task 415 also correspond to torque of the respective servomotor.

The PAM 414 is coupled to a Local Area Network (LAN) 416, the LAN 416 being coupled to a Programmable Logic Controller 418 and a supervising computer 420. In this example, the supervising computer 420 is a Personal Computer (PC).

Figure 5:
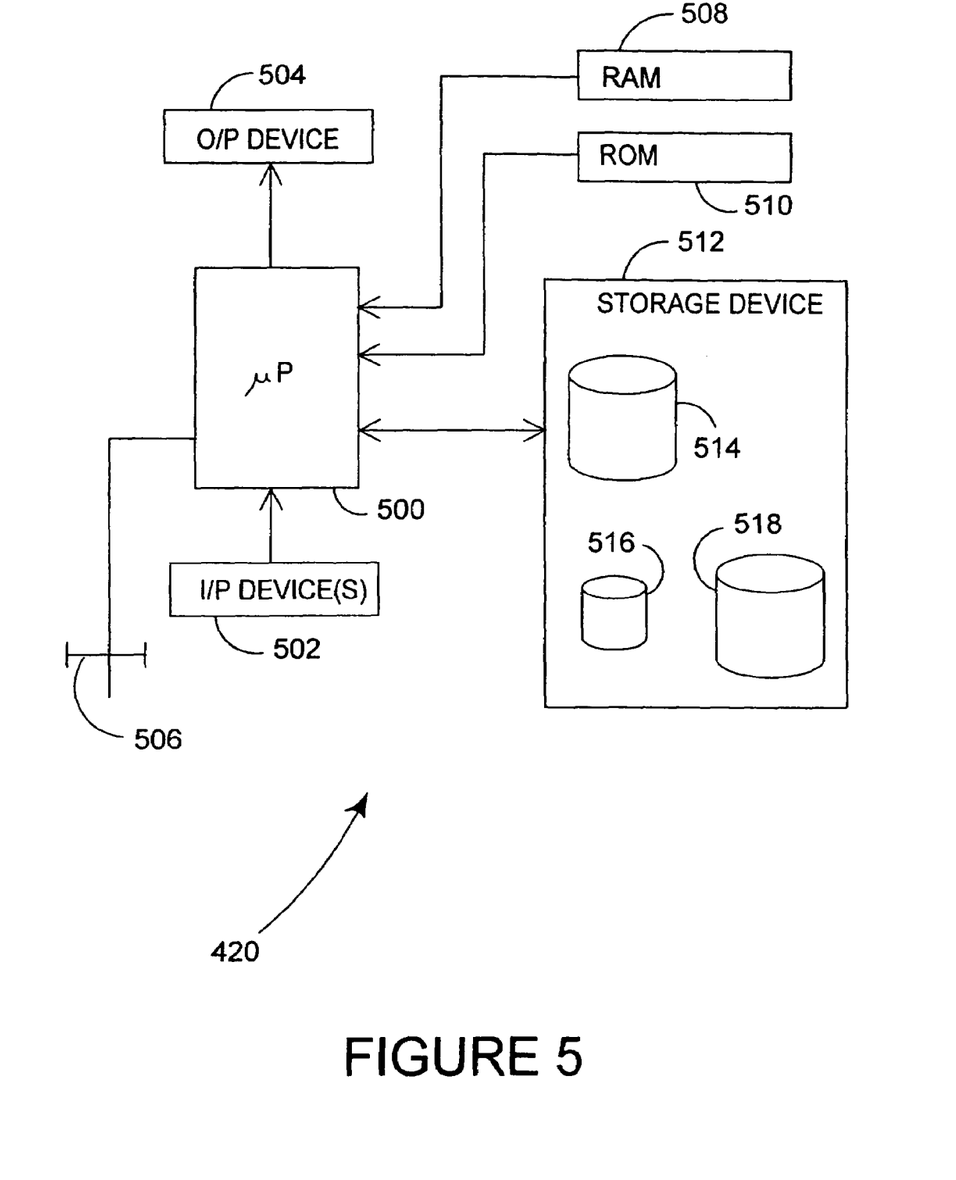
FIG. 5 is a flow diagram of a data acquisition method for use with the diagnostic system of FIG. 4.

Referring to FIG. 5, the supervising computer 420 comprises a processing unit or processor 500, to which one or more input device 502, such as a keyboard and/or a mouse, and an output device 504 such as a display, are coupled. The processor 500 is also coupled to an Input/Output (I/O) port 506, the I/O port 506 being coupled, in this example, to a port (not shown) of the LAN 416.

A first storage device, for example a volatile memory, such as Random Access Memory (RAM) 508, is coupled to the processor 500. A second storage device, for example a non-volatile memory, such as Read Only Memory (ROM) 510, is also coupled to the processor 500. As is common with most PCs, the processor 500 is also coupled to a third, re-writable non-volatile, storage device, for example, a so-called hard drive, or Hard Disc Drive (HDD) 512. The hard drive 512, in this example, stores, inter alia, a first database 514, a second database 516, and a third database 518. However, content of the first, second and third databases 514,516,518 need not be stored in a formal database structure provided by many well-known software packages, and can instead be stored, for example, as a simple look-up table.

In operation (FIGS. 6 and 7), the supervising computer 420 supports a monitoring cycle and a diagnosis cycle in order to identify abnormal operation of the packaging machine 401 or potential abnormal operation of the packaging machine 401.

Figure 6:
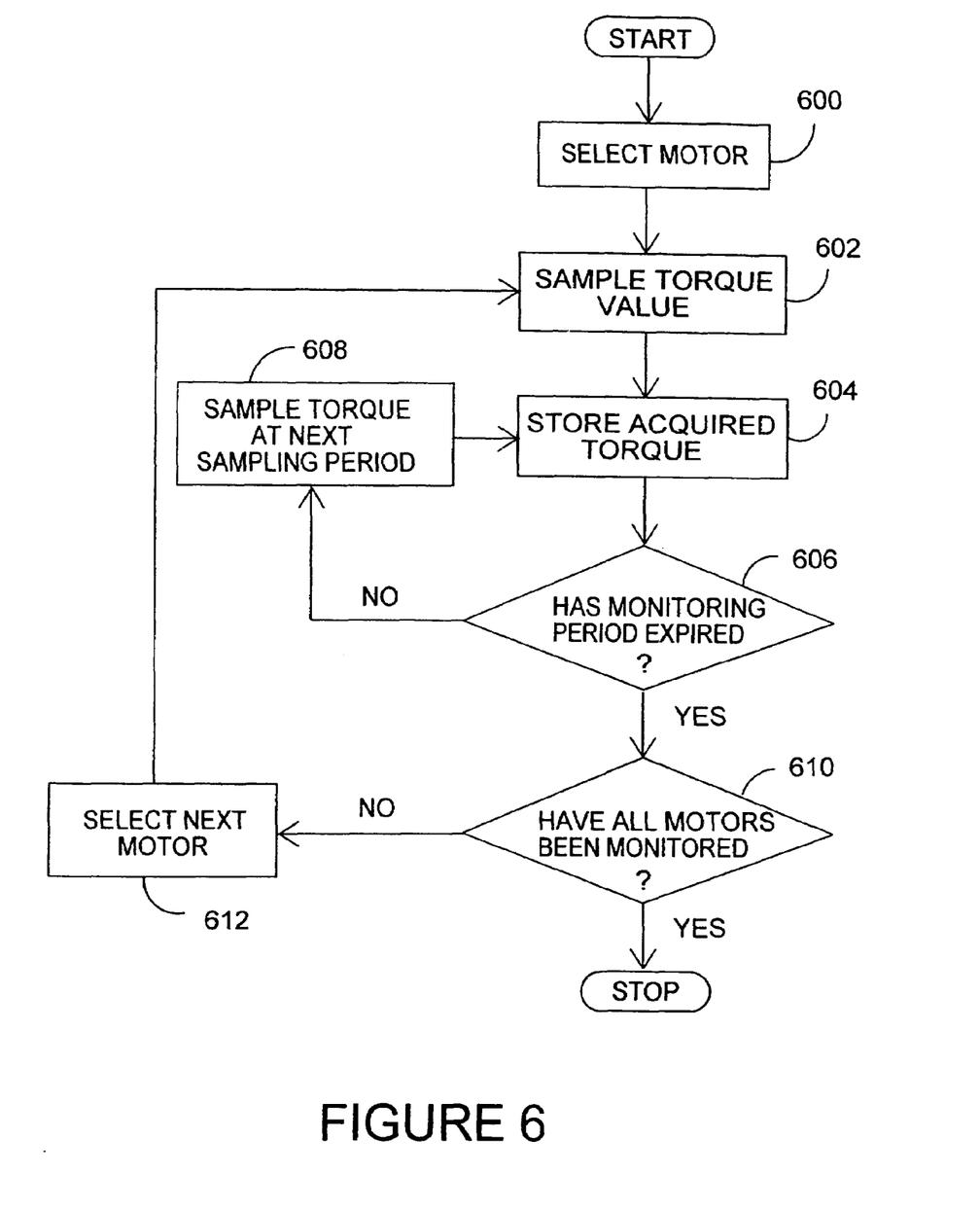
FIGS. 6 and 7 are flow diagrams of two parts of a data processing method for use with the diagnostic system of FIG. 4 and/or in conjunction with the method of FIG. 5.

With respect to FIG. 6, the supervising computer 420 identifies and selects (step 600) the first servo-motor 402 from the first, second and third servo-motors 402,404,406 to monitor over a predetermined period of time at a predetermined sampling rate. The supervising computer 420 then interrogates the PAM 414 for samples of a first driving signal issued to the first servomotor 402. The samples of the first driving signal obtained by the task 415 (step 602) are then communicated to the supervising computer 420, the first driving signal issued to the first servo-motor 402 by the first driver unit 406 corresponding to first torque exerted by the first servo-motor 402. Similarly, a second driving signal and a third driving signal respectively issued by the second and third driving units 408,410 respectively correspond to second and third torques exerted by the second and third servo-motors 404,406.

The sample of the first driving signal is subsequently stored (step 604) by the supervising computer 420 in the first database 514. After storing the sample of the first driving signal, the supervising computer 420 determines (step 606) if the period over which the first driving signal is sampled has expired. If the period has not expired the supervising computer 420 obtains (step 608) another sample of the first driving signal from the PAM 414 in respect of a subsequent sampling period and stores (step 604) this most recent sample.

If the period over which the driving signal is sampled has expired, the supervising computer 410 determines (step 610) if driving signals imposed upon other servomotors, such as the second or third servomotors 404,406 need to be sampled. If, in this example, the second or the third servo-motor 404,406 still needs to be monitored, the supervising computer 420 selects (step 612) one of the second or the third servo-motors 404,406 for monitoring. The above-described sampling procedure is then repeated for the driving signal issued to the next selected servomotor. Indeed, the above process of selection of servomotors is repeated until all of the servomotors have been monitored. The above monitoring procedure is then repeated after a predetermined period of time.

As would be appreciated by one skilled in the art in the context of this example, an actual sampling period $T_a$, is imposed by the PAM 414, the actual sampling frequency being different from a requested, or expected, sampling period $T_e$, requested by the supervising computer 420. The difference between the actual and expected sampling periods $T_a$, $T_e$, is attributable to the fact that the actual sampling period, $T_a$, set by the PAM 414 depends upon the priority of the real-time task 415 and the loading imposed upon the PAM 414 by the various servo-motors that the PAM 414 manages. However, it is possible to correct for the difference between the actual and expected sampling periods $T_a$, $T_e$, by calculating a correction factor, $\alpha$, thereby providing a way of maintaining accuracy of the samples of the driving signals of each servo-motor.

In this respect, for a given servo-motor, the actual sampling period, $T_a$, can be expressed in terms of the correction factor, $\alpha$, and the expected sampling period $T_e$:

$$T_a = \alpha T_e \quad (1)$$

Additionally, the actual position, $P_a$, of the given servo-motor can be expressed in terms of an expected speed $V_e$ of the given servo-motor and the actual sampling period, $T_a$, as a function of a sampling period number, k:

$$P_a(k) = V_e \cdot T_a \cdot k \quad (2)$$

Substituting equation (1) into equation (2), the actual position $P_a$ can be expressed in terms of the expected sampling period, $T_e$, and the correction factor, $\alpha$:

$$P_a(k) = V_e \cdot \alpha \cdot T_e \cdot k \quad (3)$$

Since a duration, t, of the sampling period number, k, is:

$$t = k \cdot T_e \quad (4)$$

By substituting equation (4) into equation (3), the actual position, $P_a$, can be expressed as a function of time, t:

$$P_a(t) = V_e \cdot \alpha \cdot t \quad (5)$$

Differentiating equation (5) with respect to time provides an expression for the actual speed, $V_a$, of the given servo-motor:

$$\frac{dP_a(t)}{dt} = V_e \cdot \alpha = V_a \quad (6)$$

Consequently, by rearranging equation (6), it can be seen that the correction factor, $\alpha$, is the quotient of the actual speed, $V_a$, and the expected speed, $V_e$.

Since the actual position, $P_a$, is obtained from the PAM 414, the actual speed, $V_a$, can be calculated as explained above. Furthermore, since the expected speed, $V_e$, is also known, the correction factor, $\alpha$, can be calculated for correction of samples of the driver signals.

In this respect, the previously sampled driving signals stored in the first database 514 are analysed in the diagnosis cycle (FIG. 7) on a motor-by-motor basis. Hereinafter, for the purpose of simplicity and clarity of description, the diagnostic cycle will be described with respect to the sample of the driver signal corresponding to the first servo-motor 402. However, it should be appreciated that the same cycle can, and is the case in this example, be applied to samples of driver signals issued to other servo-motors, for example, the second and/or third servo-motors 404,406.

Figure 7:
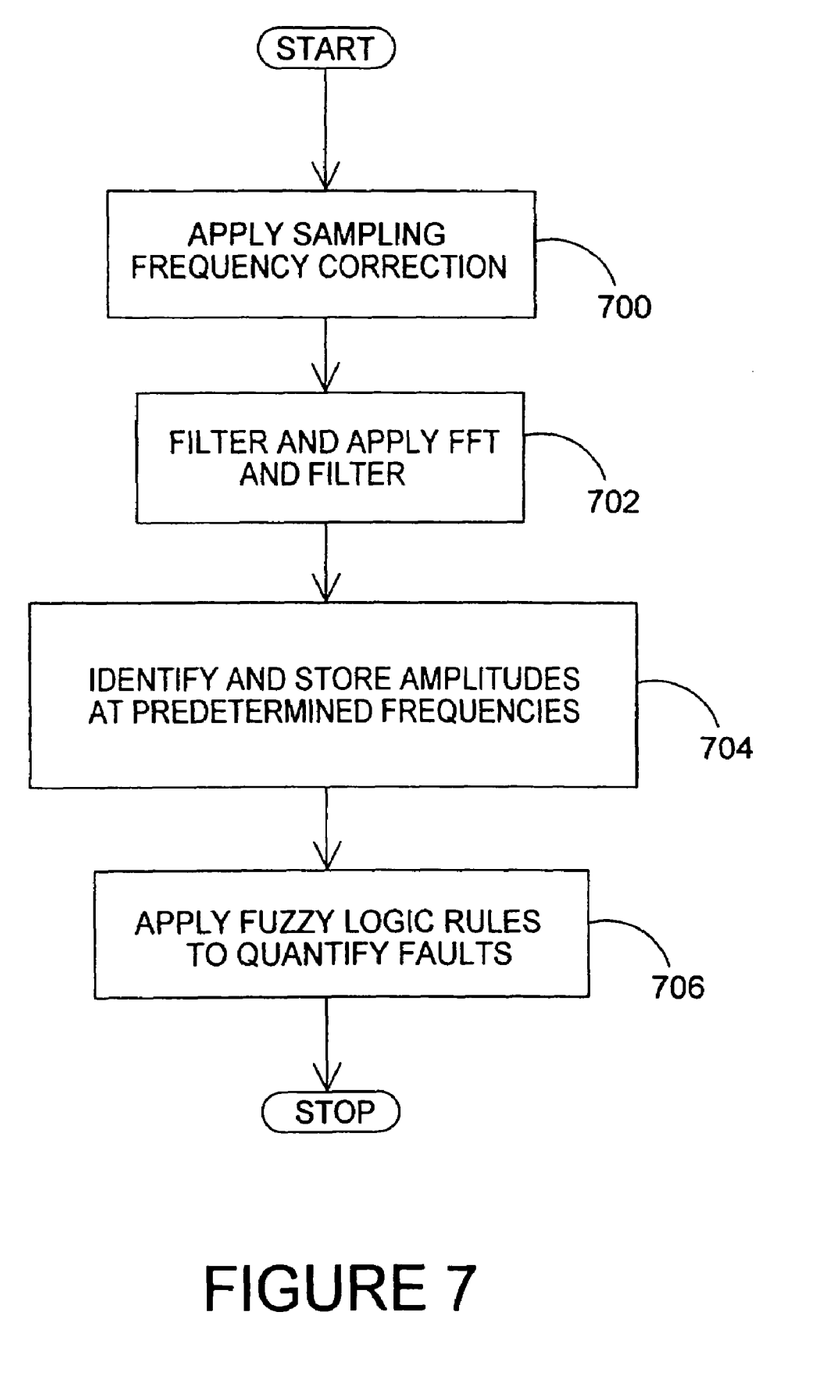

Initially, the samples of the first driver signal (hereinafter referred to as the "first samples") issued to the first servo-motor 402 are retrieved from the first database 514 stored on the hard drive 512 and pre-processed (step 700) by applying the above-described correction factor, $\alpha$, calculated in accordance with the above equations, to the first samples.

Once pre-processed, the pre-processed first samples are subjected to spectral analysis by a spectrum analyser module (not shown) supported by the supervising computer 420. In this example, the processor 500 carries out (step 702) a Fast Fourier Transfer (FFT). The FFT of the pre-processed first samples yields a spectrum which reveals much information not only about the operation of the first servo-motor 402, but also one or more mechanical element coupled directly, or indirectly, to the first servo-motor 402. In this, and other, examples, a sub-assembly of the packaging machine 401 comprises the one or more mechanical element.

If required, filters can be used to "clean-up" sampled driver signals so as to facilitate improved accuracy of spectral analysis.

Following generation of the spectrum for the pre-processed first samples, the second database 516 is interrogated to obtain information (step 704) relating to one or more relevant parameter extractable from the spectrum by analysis thereof, and corresponding to one or more known cause of abnormal operation of the packaging machine 401. In this example, for a given sub-assembly associated with the spectrum, dry friction, oily friction, sprocket engagement frequency, and lug frequency are parameters for which values corresponding to these parameters can be ascertained from the spectrum. Consequently, for a given parameter such as dry friction, the second database 516 comprises a list of a predetermined number of frequencies, the respective amplitudes at these predetermined number of frequencies characterising dry friction for a particular mechanical element or elements. Once the relevant parameters along with the identity of one or more frequency characteristic of each relevant parameter have been obtained from the second database 516, the amplitude(s) at the identified one or more frequency is/are determined from the spectrum and stored (step 704) in the second database 516.

Subsequently, the amplitudes for each frequency stored are retrieved from the second database 516 along with inference rules from the third database 518. Using the inference rules, fuzzy logic is respectively applied (step 706) to each amplitude retrieved. Clearly, if a given amplitude has been stored more than once in the second database 516 in relation to more than one parameter, the given amplitude need only be tested once, if required, by a corresponding given influence rule.

The results of the application of the fuzzy logic yield a determination of abnormal operation of one or more mechanical element of the given sub-assembly and, where abnormal operation is occurring, identification of one or more mechanical element believed to be the source of the abnormal operation.

Alternatively, instead of applying fuzzy logic, the amplitudes for each frequency stored in the second database 516 can be compared with empirically derived characterizations of the parameters being monitored, the empirically derived characterizations being stored in the third database 518. The empirically derived characterizations can be stored as ranges of acceptable values. As a further alternative, the characterizations can be learnt.

Upon detection of abnormal operation, information relating to the abnormal operation of the packaging machine 401 can be communicated to a service engineer, for example, via the display 504. Additionally, or alternatively, the supervising computer 420 can issue an instruction to the PLC 418 to activate the auto-correction device, such as the microsprayers attached to the packaging machine 401 in order to provide corrective maintenance to the one or more mechanical element to cause the packaging machine 401 to revert to a state of normal operation. Other corrective, or preventative, measures already described above in previous examples can also be employed.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

What is claimed is:

1. A system for identifying abnormal operation of a packaging machine, the system comprising: a sampling entity arranged to sample a signal issued, when in use, to a servo-motor, the signal corresponding to torque values of the servo-motor; a spectrum analyzer for generating a spectral analysis of the sampled signal; a processing unit coupled to a storage device for storing a characterization of a mechanical element coupled to the servo-motor and corresponding to a state of operation, the characterization corresponding to at least one predetermined value for each of at least one frequency of the signal; wherein the processing unit is arranged to determine, when in use, abnormal operation of the mechanical element using the spectral analysis of the sampled signal and the characterization of the mechanical element.

2. A system as claimed in claim 1, wherein the state of operation is normal operation.

3. A system as claimed in claim 1, wherein the processing unit is arranged to determine an actual sampling period of the sampling unit.

4. A system as claimed in claim 3, wherein the actual sampling period is derived from an expected sampling period, an expected speed and an actual position of the servomotor.

5. A system as claimed in claim 4, wherein a correction factor is calculated from the actual sampling period and the expected sampling period for applying to the sampled signal.

6. A system as claimed in claim 1, wherein the characterization is learnt.

7. A system as claimed in claim 1, wherein fuzzy logic is used to quantify the abnormal operation of the mechanical element.

8. A system as claimed in claim 7, wherein the at least one predetermined value for the each of the at least one frequency of the signal is embodied in at least one respective rule applicable, when in use, to the spectral analysis signal.

9. A method of identifying abnormal operation of a packaging machine, the method comprising the steps of: sampling a signal issued to a servomotor, the signal corresponding to torque values of the servo-motor; retrieving a previously stored characterization of a mechanical element coupled to the servo-motor, the characterization comprising at least one predetermined value corresponding to a plurality of the torque values of the servo-motor in a condition of normal operation; and determining abnormal operation of the mechanical element using the sampled signal and the characterization of the mechanical element.

10. A computer program element comprising: computer program means to make a computer execute the method of claim 9.

11. A computer program element as claimed in claim 10, embodied on a computer readable medium.

* * * * *